(12) United States Patent
Sargent et al.

(10) Patent No.: US 6,844,975 B2
(45) Date of Patent: Jan. 18, 2005

(54) ETALON DEVICES EMPLOYING MULTIPLE MATERIALS

(75) Inventors: Robert B. Sargent, Santa Rosa, CA (US); Charles Andrew Hulse, Sebastopol, CA (US)

(73) Assignee: JDS Uniphase Corporation, San Jose, CA (US)

(*) Notice: Subject to any disclaimer, the term of this patent is extended or adjusted under 35 U.S.C. 154(b) by 60 days.

(21) Appl. No.: 10/267,231

(22) Filed: Oct. 9, 2002

(65) Prior Publication Data

US 2004/0070833 A1 Apr. 15, 2004

(51) Int. Cl.[7] .............................................. G02B 27/00
(52) U.S. Cl. ...................... 359/577; 359/581; 359/578; 359/588; 359/587; 359/260; 359/247
(58) Field of Search ................................. 359/260, 580, 359/578, 579, 587, 590, 589, 577, 581, 588, 247, 254; 372/20; 385/14, 15, 24

(56) References Cited

U.S. PATENT DOCUMENTS

| | | |
|---|---|---|
| 4,818,661 A | 4/1989 | Taylor et al. |
| 5,156,720 A | 10/1992 | Rosenfeld et al. |
| 5,225,926 A | 7/1993 | Cuomo et al. |
| 5,375,181 A | 12/1994 | Miller et al. |
| 5,384,877 A | 1/1995 | Stone |
| 5,587,831 A | 12/1996 | Simon et al. |
| 5,666,225 A | 9/1997 | Colbourne |
| 5,739,945 A * | 4/1998 | Tayebati .................. 359/291 |
| 5,982,488 A | 11/1999 | Shirasaki |
| 6,005,995 A | 12/1999 | Chen et al. |
| 6,103,305 A | 8/2000 | Friedmann et al. |
| 6,137,812 A | 10/2000 | Hsu et al. |
| 6,181,726 B1 | 1/2001 | Lunt |
| 6,215,592 B1 | 4/2001 | Pelekhaty |
| 6,215,802 B1 | 4/2001 | Lunt |
| 2002/0076147 A1 | 6/2002 | Cush et al. |
| 2002/0171936 A1 * | 11/2002 | Ockenfuss et al. ......... 359/577 |

FOREIGN PATENT DOCUMENTS

| | | | | |
|---|---|---|---|---|
| JP | 2000017126 | 8/2001 | | G02B/5/28 |
| JP | 2000089940 | 10/2001 | | G02B/5/28 |

OTHER PUBLICATIONS

"Three–mirror fibre Fabry–Perot filters of Optimal Design" Stone et al., *Electronics Letters*, vol. 26, No. 24, Jul. 1990, pp. 1073–1074.

* cited by examiner

*Primary Examiner*—Fayez Assaf
(74) *Attorney, Agent, or Firm*—Allen, Dyer, Doppelt Milbrath & Gilchrist, P.A.

(57) ABSTRACT

The invention provides a substantially athermal etalon. In one embodiment, the multi-cavity etalon includes at least one free-standing multi-layer thin film and is rendered thermally stable through the use of the free-standing multi-layer film and spacers having predetermined thermal expansion coefficients. In another embodiment, the multi-cavity etalon is rendered thermally stable through the use of mixed spacers.

13 Claims, 12 Drawing Sheets

ETALON DEVICES EMPLOYING MULTIPLE MATERIALS

CROSS-REFERENCE TO RELATED APPLICATIONS

Not Applicable

MICROFICHE APPENDIX

Not Applicable

FIELD OF THE INVENTION

This invention relates generally to the field of etalons, and in particular, to multi-cavity etalons and/or etalons having a self-supporting thin film.

BACKGROUND OF THE INVENTION

Implementation of Wavelength Division Multiplexing (WDM) and Dense Wavelength Division Multiplexing (DWDM) technology in fiber communications systems has led to significant improvements in data transmission rates and available bandwidth. Etalons have been proven useful for many WDM and DWDM technologies, and for example, are found in interleavers/deinterleavers, wavelength lockers, spectrum analysers, and optical filters.

In general, an etalon is formed from two partially transmitting mirrors, or surfaces, separated by a predetermined gap that forms a cavity. Referring to FIGS. 1a, 1b, an etalon is shown at resonance transmitting a series of equally spaced wavelengths, $\lambda_{1-n}$. In particular, the etalon has a periodic response to a multi-wavelength input signal, according to the following equation $$2d \cdot n \cdot \cos\theta = m\lambda \tag{1}$$

where d is the width of the gap, n is the index of refraction of the medium in the cavity, $\theta$ is the angle of incidence of the input beam, and m is the mode number or order of interference. When the cavity medium is air or vacuum, the etalon is referred to as an air-spaced etalon. When the cavity medium is a transmissive solid, such as glass, the etalon is called a solid etalon.

In air spaced etalons, each mirror is typically a thin partially reflective coating deposited on an optically transparent substrate. The mirrors are arranged with the reflective surfaces facing one another, while a spacer disposed out of the optical path, provides the predetermined gap therebetween. For example, air-spaced etalons have been manufactured from a pair of opposing multi-layer thin film filters and separated by a fused silica spacer. In solid etalons, the reflective coatings are deposited directly on opposing ends of a relatively thick, optically transparent substrate that serves as the spacer and the cavity medium. In these cases, the width of the gap is equal to the width of the substrate.

There are a number of disadvantages associated with most air-spaced and solid etalons found in the prior art. A first disadvantage of most prior art etalons is that the substrate, i.e., the filter substrate in air-spaced etalons or the spacer in solid etalons, limits the optical performance of the etalon. For example, the substrate is generally associated with a specific transmission window and a small amount of loss that is dependent upon the composition and thickness of the substrate. Furthermore, since the composition and thickness of the substrate must be chosen for a specific transmission window, and such that it is compatible with the deposition process, it is difficult to engineer the substrate for other properties, such as thermal stability. U.S. Pat. No. 5,156,720 to Rosenfeld entitled PROCESS FOR PRODUCING RELEASED VAPOUR DEPOSITED FILMS AND PRODUCT PRODUCED THEREBY, U.S. Pat. No. 5,225,926 to Cuomo et al. entitled DURABLE OPTICAL ELEMENTS FABRICATED FROM FREE STANDING POLYCRYSTALLINE DIAMOND AND NON-HYDROGENATED AMORPHOUS DIAMOND LIKE CARBON (DLC) THIN FILMS, and U.S. Pat. No. 6,103,305 to Friedmann et al. entitled METHOD OF FORMING A STRESS RELIEVED AMORPHOUS TETRAHEDRALLY-COORDINATED CARBON FILM, incorporated herein by reference, each disclose free-standing thin films that obviate some disadvantages of substrates.

A second disadvantage of prior art etalons relates to thermal instability, as alluded to above. According to Eq. 1 the spectral response of an etalon is dependent on the width of the gap and the refractive index of the cavity medium. If the etalon spacer is fabricated from a material having a large coefficient of thermal expansion, an increase in temperature can increase the gap width, and as a result, shift the spectral response. Advantageously, spacers made with material having a low coefficient of thermal expansion can make single air-spaced etalons substantially temperature insensitive. However, this is not typically the case for solid etalons, where the change in refractive index of the spacer with temperature will also affect the optical path length of the cavity. For example, Corning's ULE™ and Schott's Zerodur™ both have an approximately zero coefficient of thermal expansion and exhibit a positive change in index of refraction with increasing temperature. Various attempts to create athermal etalons have been proposed, as for example, in U.S. Pat. No. 5,384,877 to Stone entitled PASSIVE TEMPERATURE-INSENSITIVE FABRY-PEROT ETALONS, U.S. Pat. No. 5,375,181 to Miller et al. entitled TEMPERATURE COMPENSATED FIBRE FABRY-PEROT FILTERS, U.S. Pat. No. 6,215,802 to Lunt entitled THERMALLY STABLE AIR-GAP ETALON FOR DENSE WAVELENGTH-DIVISION MULTIPLEXING APPLICATIONS, and U.S. Pat. No. 6,005,995 to Chen et al. entitled FREQUENCY SORTER, AND FREQUENCY LOCKER FOR MONITORING FREQUENCY SHIFT OF RADIATION SOURCE, all incorporated herein by reference.

A third disadvantage of prior art etalons, that is also a consequence of their thermal instability, relates to the difficulty in producing high performance multi-cavity etalons. Multi-cavity etalons, which have two or more sequential cavities, show great potential for producing complex spectral responses. For example, it is known that a multi-cavity etalon can exhibit a wider and squarer spectral response than a single cavity etalon. See, for example, the paper referenced as J. Stone, L. W. Stulz, A. A. M. Saleh, "Three-mirror fibre Fabry-Perot filters of optimal design, Electronics Letters, Vol. 26, No. 14, July 1990. However, to date, it has not been feasible to create an athermal multi-cavity etalon without tuning the etalon and/or providing a thermally stable environment, since the substrates, which are part of the mirrors in air-spaced etalons and serve as the cavity in solid etalons, exhibit a significant change of refractive index with temperature and typically have a moderate to high coefficient of thermal expansion.

It is an object of this invention to provide a thermally stable multi-cavity etalon.

It is another object of this invention is to provide a thermally stable etalon.

It is another object of this invention is to provide an etalon fabricated from self-supporting filters.

SUMMARY OF THE INVENTION

In accordance with the invention there is provided an etalon comprising: a first reflector; and a second reflector opposing the first reflector, the first and second reflectors mounted in a spaced-apart relationship to form a gap therebetween, wherein at least one of the first and second reflectors includes a free-standing multi-layer thin film.

In accordance with the invention there is provided an etalon comprising: a first partially reflective reflector; a second partially reflective reflector opposing the first partially reflective reflector; and at least one free-standing multi-layer thin film filter optically disposed between the first and second partially reflective reflectors, the first and second partially reflective reflectors each disposed a predetermined distance from the at least one free-standing multi-layer thin film filter.

In accordance with the invention there is provided an etalon comprising: a first reflector having a reflective surface and a substrate supporting the reflective surface; a second reflector having a reflective surface and a substrate supporting the reflective surface, the second reflector disposed such that its substrate faces the substrate of the first reflector; and, a spacer disposed for maintaining the first and second reflectors in a spaced-apart relationship to form a gap therebetween, wherein the spacer has a coefficient of thermal expansion selected to compensate for changes in refractive index and physical dimensions of the substrates resulting from temperature fluctuations.

In accordance with the invention there is provided a multi-cavity etalon comprising: a plurality of cavities, each cavity including a light transmissive substrate and a spacer coupled to the light transmissive substrate; and a partially transmissive reflector disposed between adjacent cavities.

BRIEF DESCRIPTION OF THE DRAWINGS

Exemplary embodiments of the invention will now be described in conjunction with the drawings in which:

FIG. 2b is an exploded view of the etalon shown in FIG. 2a;

FIG. 3b is an exploded view of the etalon shown in FIG. 3a;

FIG. 4b is an exploded view of the etalon shown in FIG. 4a;

FIG. 5b is an exploded view of the etalon shown in FIG. 5a;

FIG. 6b is an exploded view of the etalon shown in FIG. 6a;

FIG. 6c is a schematic diagram of a multi-cavity etalon formed by cascading four etalons shown in FIG. 6a;

FIG. 7b is an exploded view of the etalon shown in FIG. 7a;

FIG. 8b is an exploded view of the etalon shown in FIG. 8a.

DETAILED DESCRIPTION OF THE INVENTION

In one embodiment, the present invention provides an etalon, or etalon device, that uses at least one self-supporting thin film. Preferably, the self-supporting thin film is a multi-layer dielectric optical filter that has been removed from a temporary substrate to form a free-standing thin film. For example, in one embodiment the temporary substrate is pretreated by depositing a release layer, which is a thin layer of water-soluble material, such as a 10–50 nm layer of sodium chloride (NaCl). The thin film layers (e.g., 2–6 alternating layers of high and low index of refraction materials selected to achieved the desired reflectivity) are deposited on the pretreated substrate using one of the conventional deposition methods, such as Physical Vapor Deposition (PVD), Chemical Vapor Deposition (CVD) and hybrid PVD/CVD methods. The thin film layers are released from the substrate spontaneously. Alternatively, delamination is initiated by scratching a region of the coating to form a small, deep groove therein. For example, thin films having a thickness in the order of 1–100 $\mu$m and a length in the order of 0.5–50 mm have been fabricated. Preferably, the thin films have a thickness in the order of 15–100 $\mu$m. Optionally, the released thin film filter is cut to desired size and shape and/or is mounted to another substrate, such as a frame having a central aperture, or another optical component. For example, two potential mounting methods include optical contacting and/or mechanical coupling (i.e., clamping the components together). Alternatively, before releasing the thin film layers from the temporary substrate, an appropriately chosen frame is affixed without permanent bonding to the surface of the coating, which may, for example, be coated with a thermoplastic or thermoset resin. At this point, the release layer is activated, freeing the filter from its substrate and confining a selected region thereof to the associated frame element. Each filter is then permanently bonded to the frame by subsequently curing of the adhesive. Self-supporting filters, as discussed above, are disclosed in U.S. patent application Ser. No. 10/004,142, incorporated herein by reference. Advantageously, the use of thin film multi-layer filters allows the spectral response of the etalon to be varied. For example, etalons having a different finesse are feasible.

Figure 1A:
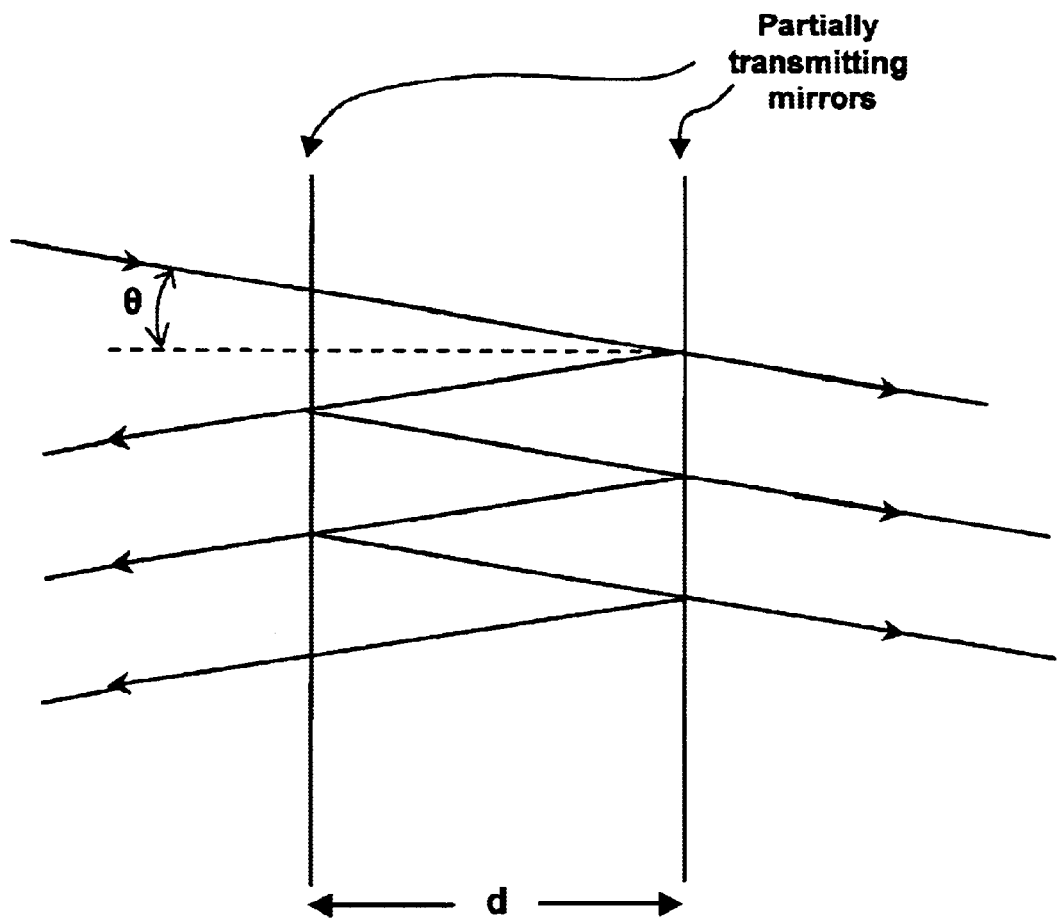
FIG. 1a is a schematic diagram of a prior art etalon.
Figure 1B:
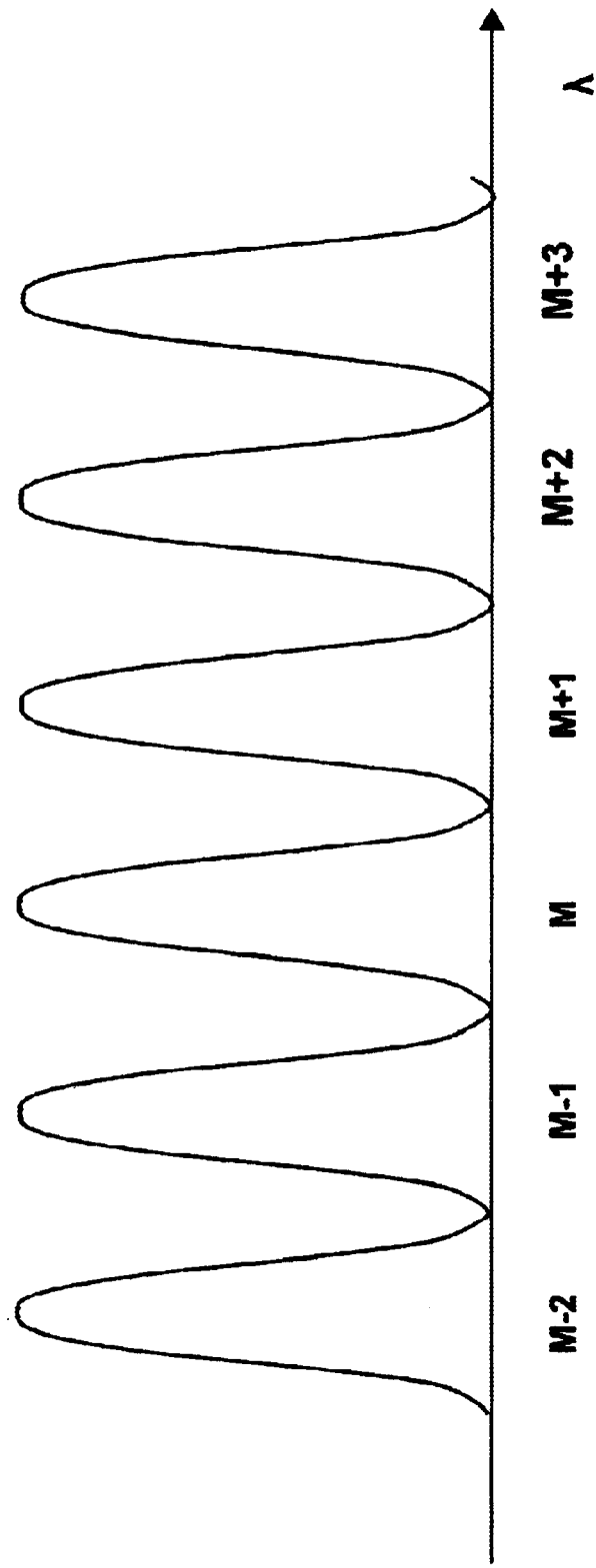
FIG. 1b is a schematic diagram of the spectral response of the etalon in FIG. 1a to multi-wavelength light.
Figure 2A:
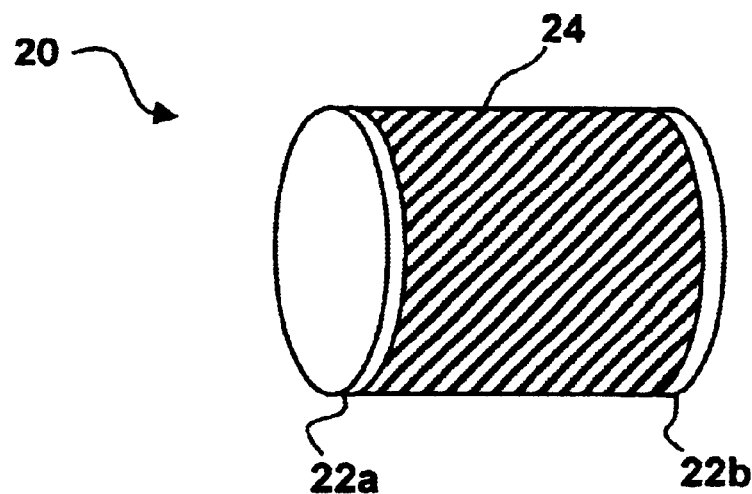
FIG. 2a is a schematic diagram of an etalon in accordance with an embodiment of the instant invention.

Referring to FIGS. 2a,b, there is shown a schematic illustration of an air-spaced etalon in accordance with an embodiment of the instant invention. The etalon 20 includes a spacer 24 sandwiched between a first 22a and second 22b self-supporting filters. Preferably, each self-supporting filter 22a, 22b is a multi-layer dielectric optical filter as described heretofore. The spacer 24, which is shown as an annular ring, serves as a frame to mount the filters 22a, 22b, and to create a cavity therebetween. Although, the spacer 24 is shown as a single annular ring, any spacer or combination of spacers, that lies outside the optical path of the etalon is also within the scope of the instant invention. Preferably, the filters 22a, 22b are mounted to the spacer 24. Optionally, the spacer 24 is formed from a material with a low thermal coefficient of expansion.

Figure 2B:
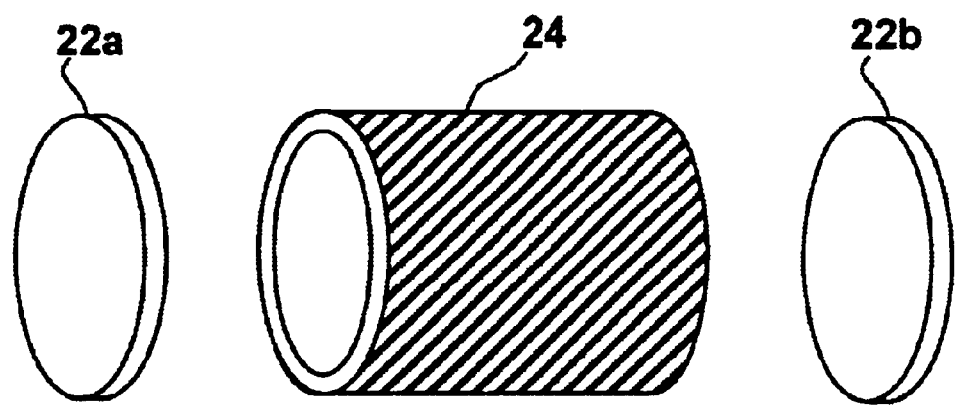

Advantageously, the etalon shown in FIGS. 2a, 2b is fabricated from self-supporting thin film filters. When the spacer 24 is constructed from a material with a low thermal coefficient of expansion, the etalon is substantially athermal.

Figure 3A:
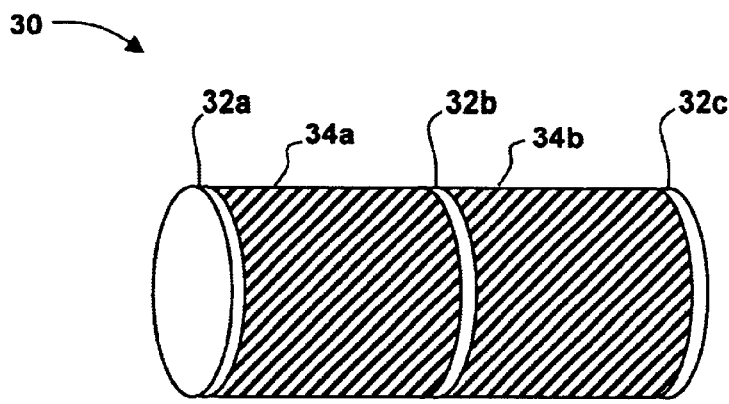
FIG. 3a is a schematic diagram of a two-cavity etalon in accordance with an embodiment of the instant invention.
Figure 3B:
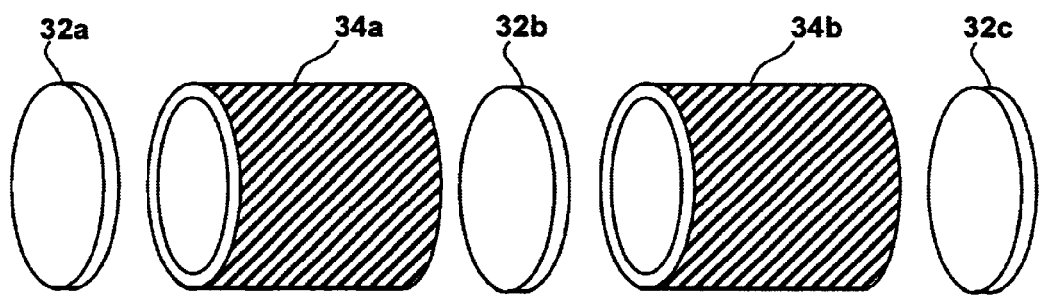

Referring to FIGS. 3a,b, there is shown a schematic illustration of two-cavity etalon in accordance with an embodiment of the present invention. The etalon 30 includes self-supporting filters 32a, 32b, and 32c alternating with spacers 34a and 34b. Preferably, the self-supporting filters 32a, 32b, 32c are multi-layer dielectric optical filters as described heretofore. The first and second spacers 34a, 34b, which are shown as annular rings, serve as frames to mount the filters 32a, 32b, 32c, and to create the dual cavities. Although, the spacers 34a, 34b are shown as single annular rings, any spacer or combination of spacers, that lies outside the optical path of the etalon is also within the scope of the present invention. Preferably, the filters 32a, 32b, 32c are mounted to the spacers 34a, 34b. Optionally, each of the spacers 34a, 34b is formed from a material having a low coefficient of thermal expansion.

When the spacers 34a, 34b are constructed from a material having a low coefficient of thermal expansion, the present embodiment provides a multi-cavity etalon that is substantially athermal. In particular, since the interior thin film is not deposited on an optically transparent substrate, as observed in prior art multi-cavity etalons, there is no associated temperature instability associated therewith. Notably, temperature induced changes in optical path length resulting from the thin film itself may be reduced when each of the spacers 34a, 34b is formed from a material having a slightly negative coefficient of thermal expansion.

Figure 4A:
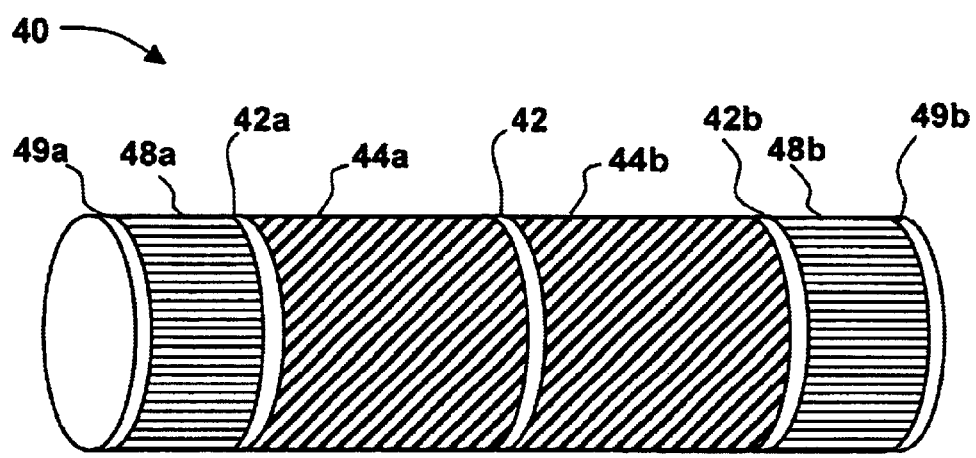
FIG. 4a is a schematic diagram of a two-cavity etalon in accordance with another embodiment of the instant invention.

Referring to FIGS. 4a,b, there is shown a schematic illustration of two-cavity etalon in accordance with an embodiment of the present invention. The etalon 40 includes self-supporting filters 42, 42a, and 42b. Self-supporting filter 42 is sandwiched between first 44a and second 44b spacers, while self-supporting filter 42a abuts optically transparent substrate 48a, and self-supporting filter 42b abuts optically transparent substrate 48b. Preferably, the self-supporting filters 42, 42a, 42b are multi-layer dielectric optical filters as described heretofore. The first and second spacers 44a, 44b, which are shown as annular rings, serve as frames to mount the filter 42 and to create the dual cavities. Although, the spacers 44a, 44b are shown as single annular rings, any spacer or combination of spacers that lie outside the optical path of the etalon are also within the scope of the present invention. Preferably, the filters 42, 42a, 42b are mounted to the spacers 44a, 44b and/or and the optically transparent substrates 48a, 48b. Optionally, each of the spacers 44a, 44b is formed from a material having a low coefficient of thermal expansion. Further optionally, each substrate 48a, 48b is wedged. Further optionally, an external end of each substrate 48a, 48b is coated with an anti-reflection coating 49a, 49b, respectively.

Figure 4B:
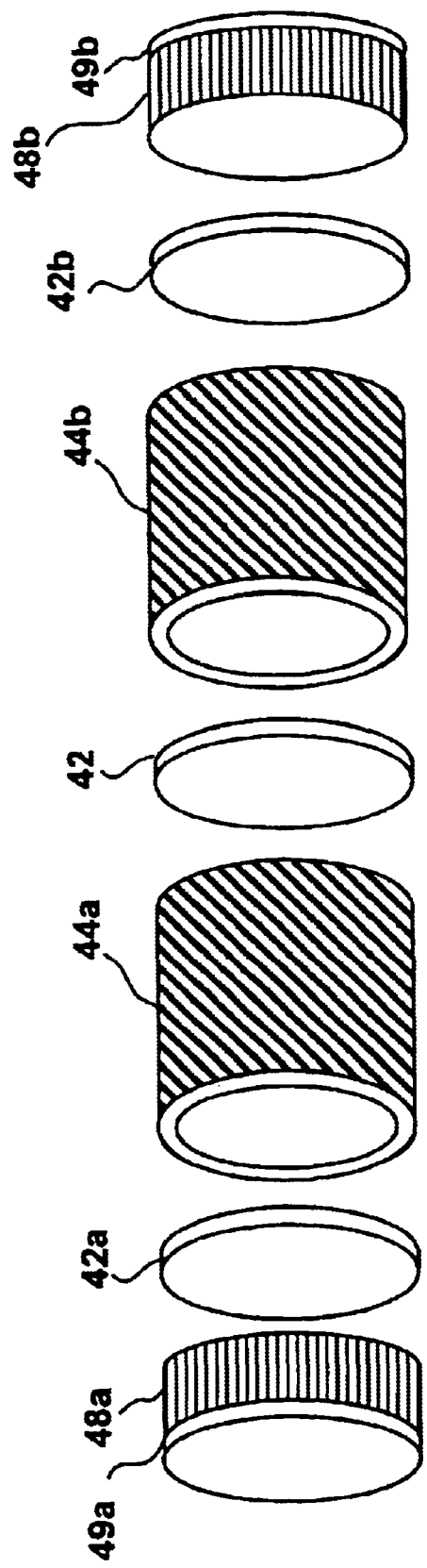

Advantageously, the etalon shown in FIGS. 4a, 4b is fabricated from self-supporting thin film. When the spacers 44a, 44b are constructed from a material having a low coefficient of thermal expansion, the present embodiment provides a multi-cavity etalon that is substantially athermal. The use of external substrates provides a more robust athermal multi-cavity etalon.

Figure 5A:
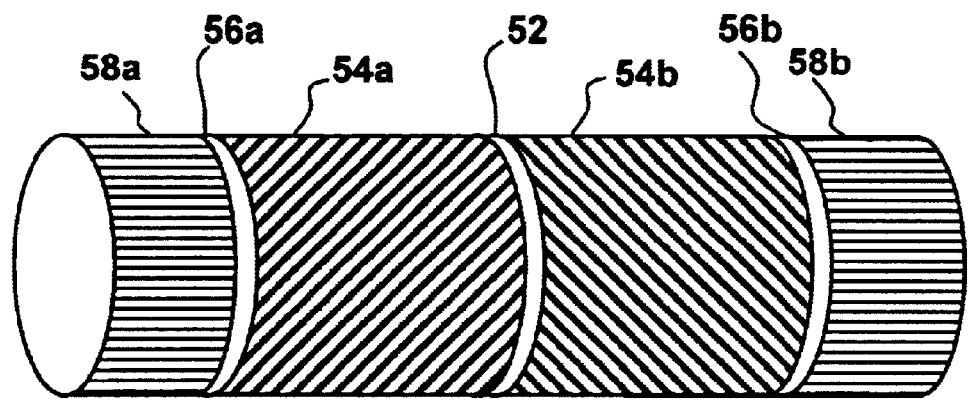
FIG. 5a is a schematic diagram of a two-cavity etalon in accordance with another embodiment of the instant invention having thick endplates.

Referring to FIGS. 5a,b, there is shown a schematic illustration of two-cavity etalon in accordance with another embodiment of the instant invention having thick endplates. The etalon 50 includes self-supporting filter 52, which is sandwiched between first 54a and second 54b spacers. Preferably, the self-supporting filter 52 is a multi-layer dielectric optical filter as described heretofore. The first and second spacers 54a, 54b, which are shown as annular rings, serve as frames to mount the filter 52 and/or to create the dual cavities. Although, the spacers 54a, 54b are shown as single annular rings, any spacer or combination of spacers that lie outside the optical path of the etalon are also within the scope of the instant invention. Preferably, the filter 52 is mounted to the spacers 54a, 54b. Optionally, each of the spacers 54a, 54b is formed from a material having a low coefficient of thermal expansion.

Etalon 50 further includes a thick endplate disposed on an external end of each spacer 54a, 54b. In particular, a first endplate including a thin film filter 56a deposited on a substrate 58a is shown abutting first spacer 54a, while a second endplate including thin film filter 56b deposited on substrate 58b is shown abutting second spacer 54b. Optionally, the exterior ends of substrates 58a, 58b are coated with an antireflection coating (not shown) to improve transmission. Further optionally, each substrate 58a, 58b is wedged (not shown).

Figure 5B:
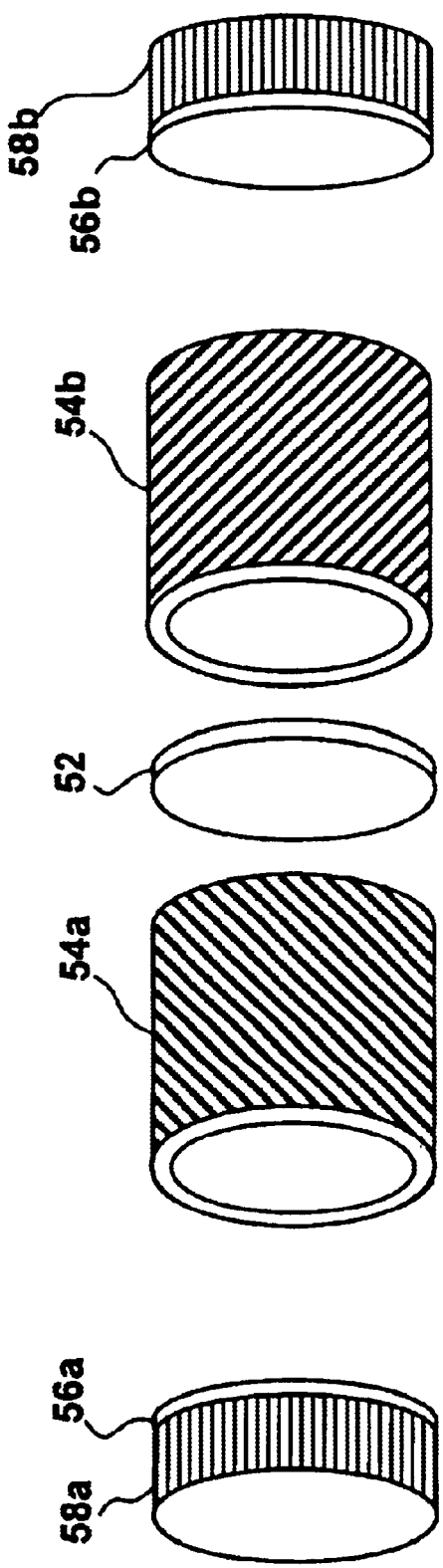

Advantageously, the etalon shown in FIGS. 5a, 5b is fabricated from a self-supporting thin film filter. When the spacers 54a, 54b are constructed from a material having a low coefficient of thermal expansion, the present embodiment provides a multi-cavity etalon that is substantially athermal. The use of readily available thick end plates provides a more robust athermal multi-cavity etalon.

Figure 6A:
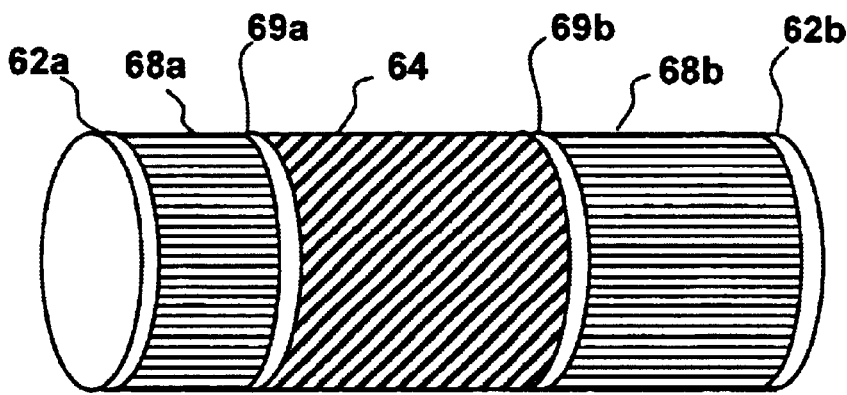
FIG. 6a is a schematic diagram of an athermal etalon in accordance with another embodiment of the instant invention having two cavity media.

Referring to FIGS. 6a,b, there is shown a schematic illustration of single-cavity etalon in accordance with another embodiment of the present invention. The etalon 60 includes self-supporting filters 62a and 62b, optically transparent substrates 68a and 68b, antireflection coatings 69a, 69b, and spacer 64. Preferably, self-supporting filters 62a and 62b are multi-layer dielectric optical filters as described heretofore. The cavity is a composite cavity, wherein the spacer 64, which is shown as an annular ring, provides an air-gap portion and the substrates 68a, 68b provide a solid portion. Although, the spacer 64 is shown as a single annular ring, any spacer or combination of spacers, that lies outside the optical path of the etalon is also within the scope of the present invention. Preferably, the filters 62a and 62b are mounted to the substrates 68a, 68b. Preferably, the spacer 64 is formed from a material having a low, zero, or negative thermal coefficient of expansion that is selected to impart thermal stability to the etalon. In particular, the spacer 64 is constructed from a material having a coefficient of thermal expansion that compensates for the refractive index change and the coefficient of thermal expansion of the substrates 68a and 68b. For example, in one embodiment the spacer in a 100 GHz hybrid etalon includes two 0.11 mm fused silica plates (with a coefficient of thermal expansion of about 0.55 ppm and a change of refractive index with temperature of about $9.9 \times 10^{-6}$/degree C.) and a 1.18 mm OHARA NEX-C™ spacer (with a coefficient of thermal expansion of about −2 ppm). Of course, any spacer, or combination of spacers, that lies outside the optical path of the etalon and is engineered to compensate for the other optical components is possible.

Figure 6B:
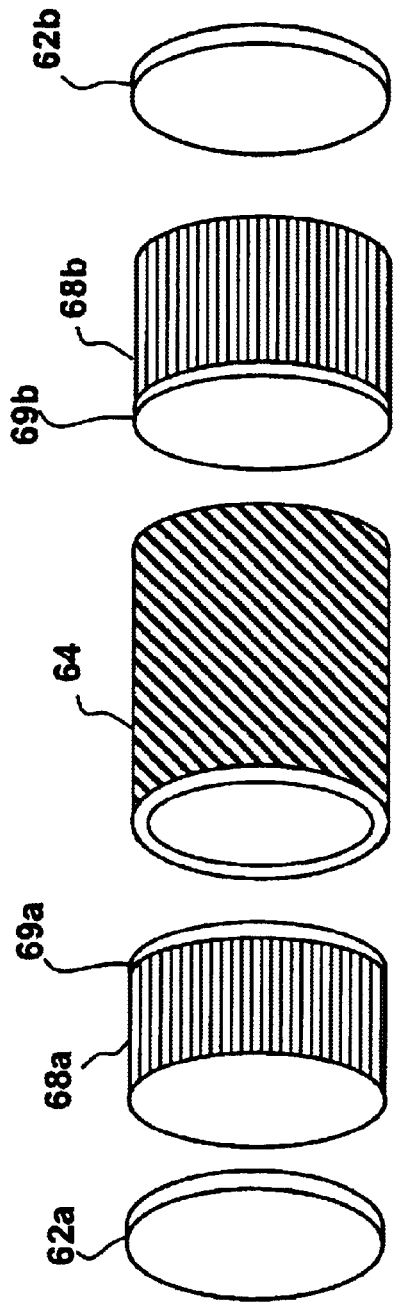
Figure 6C:
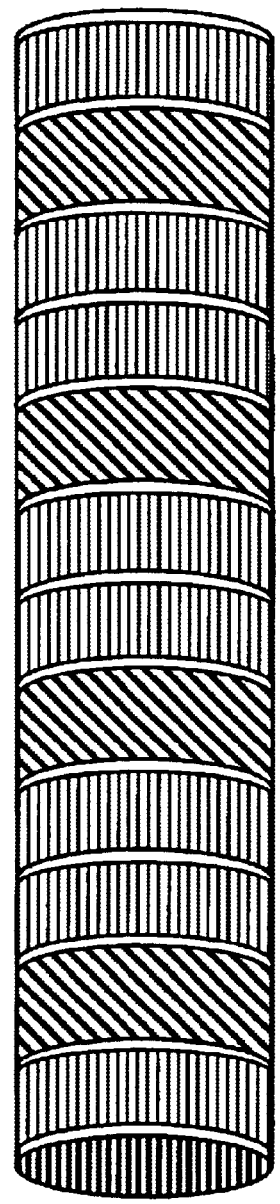

FIG. 6c shows a multi-cavity etalon formed by cascading four of the etalons shown FIG. 6a. Conveniently, this multi-cavity etalon is made athermal by the selective engineering of the spacer materials, as described above.

The self-supporting filters 62*a* and 62*b* in FIGS. 6*a,b* are multi-layer dielectric optical filters as described heretofore. Alternatively, each self-supporting filter 62*a*, 62*b* mounted to a substrate 68*a*, 68*b* is replaced with a conventional multi-layer filter formed by depositing a multi-layer thin film on a substrate.

Figure 7A:
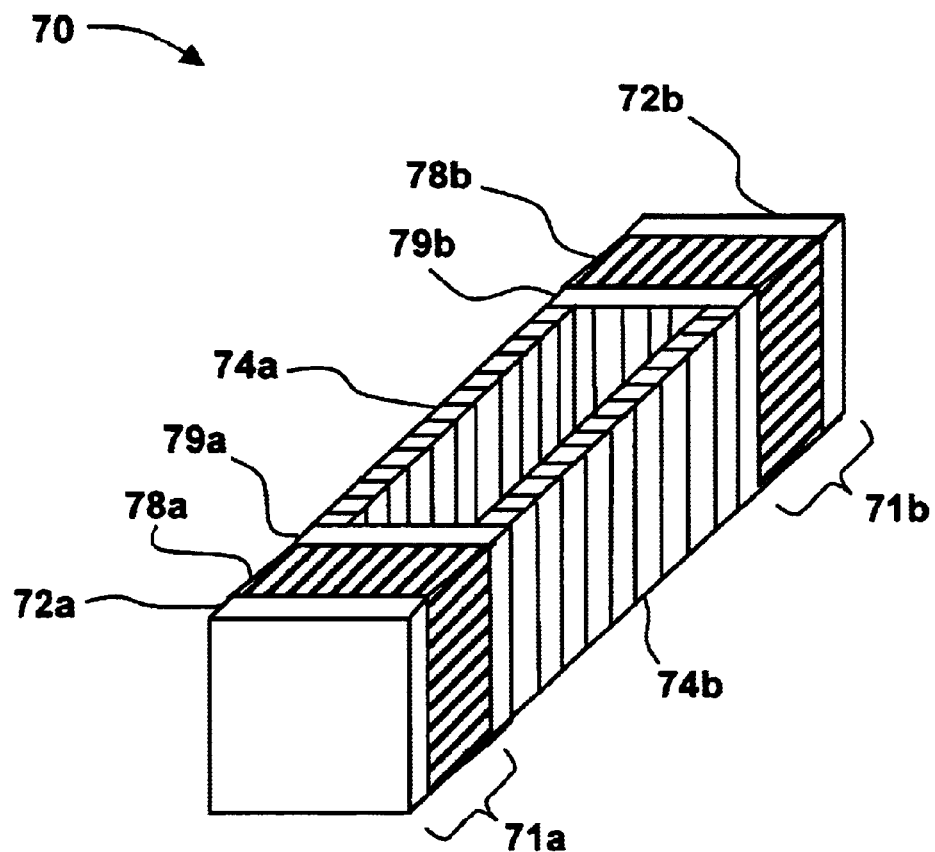
FIG. 7a is a schematic diagram of an athermal etalon in accordance with an embodiment of the instant invention.
Figure 7B:
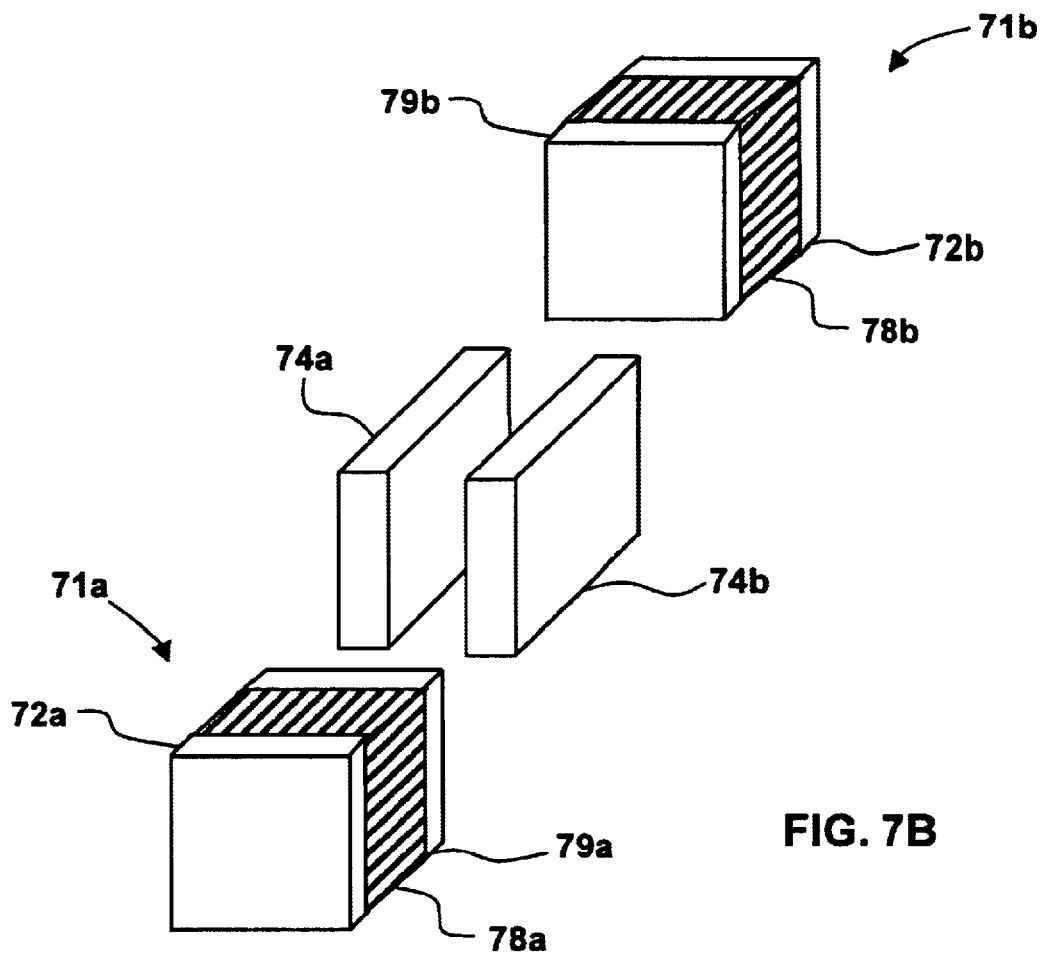

Referring to FIGS. 7*a,b*, there is shown a schematic illustration of single-cavity etalon in accordance with an embodiment of the present invention. The etalon 70 includes filters 71*a* and 71*b* and spacers 74*a*, 74*b*. The filters 71*a* and 71*b* are multi-layer dielectric optical films 79*a* and 79*b* deposited on substrates 78*a* and 78*b*, and coated with an index matching coating 72*a* and 72*b*, respectively. The cavity is a composite cavity, wherein the spacers 74*a,b*, which are shown as two separate bars, provide an air-gap portion and the substrates 78*a*, 78*b* provide a solid portion. Although, the spacers 74*a,b* are shown as two bars, any spacer or combination of spacers, that lies outside the optical path of the etalon is also within the scope of the instant invention. Preferably, the spacers 74*a,b* are formed from a material having a low, zero, or negative thermal coefficient of expansion that is selected to impart thermal stability to the etalon. In particular, the spacers 74*a,b* are constructed from a material having a coefficient of thermal expansion that compensates for the refractive index change and the coefficient of thermal expansion of the substrates 78*a* and 78*b*.

Figure 7C:
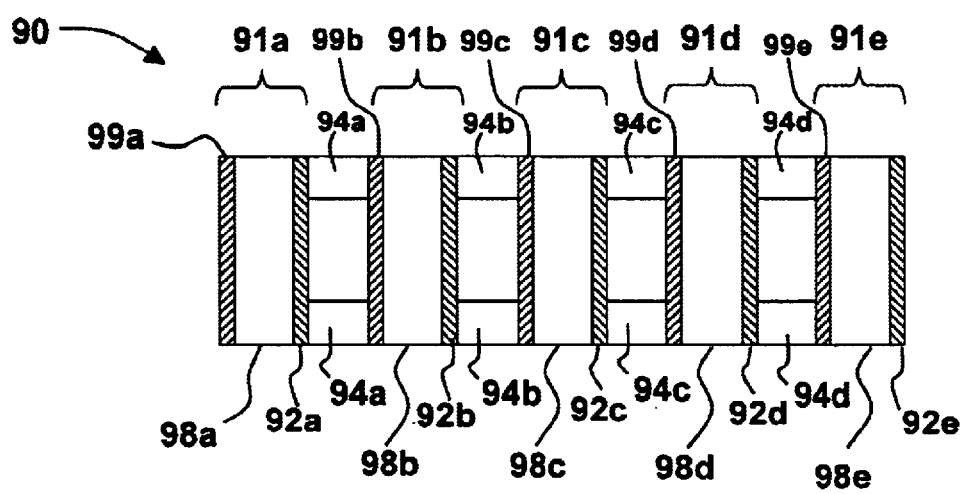
FIG. 7c is a schematic diagram of a multi-cavity etalon in accordance with an embodiment of the instant invention.

FIG. 7*c* shows a multi-cavity etalon in accordance with an embodiment of the present invention. The multi-cavity etalon 900 includes filters 91*a–e* separated by spacers 94*a–e*. Each filter 91*a–e* includes a multi-layer film 99*a–e* deposited on a substrate 98*a–e*, respectively. Each substrate 98*a–e* is also coated with an anti-reflection coating 92*a–e*, respectively. The cavities are composite cavities, wherein the spacers 94*a–e*, which are two separate bars, provide an air-gap portion and the substrates 98*a–e* provide a solid portion. Although, the spacers 94*a–e* are shown as two bars, any spacer or combination of spacers, that lies outside the optical path of the etalon is also within the scope of the instant invention. Preferably, the spacers 94*a–e* are formed from a material having a low, zero, or negative thermal coefficient of expansion that is selected to impart thermal stability to the etalon. In particular, the spacers 94*a–e* are constructed from a material having a coefficient of thermal expansion that compensates for the refractive index change and the coefficient of thermal expansion of the substrates 98*a–e*. For example, in one embodiment a 100 GHz composite etalon includes a 0.22 mm fused silica plate (with a coefficient of thermal expansion of about 0.55 ppm and a change of refractive index with temperature of about 9.9× $10^{-6}$/degree C.) and a 1.18 mm OHARA NEX-C™ spacer (with a coefficient of thermal expansion of about –2 ppm), with reflectors on either side.

Figure 8A:
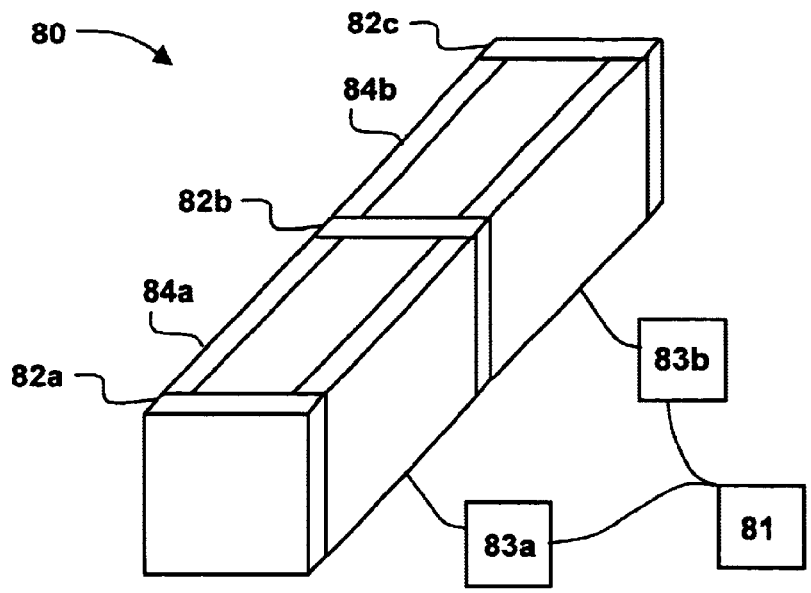
FIG. 8a is a schematic diagram of a tunable multi-cavity etalon in accordance with yet another embodiment of the instant invention.
Figure 8B:
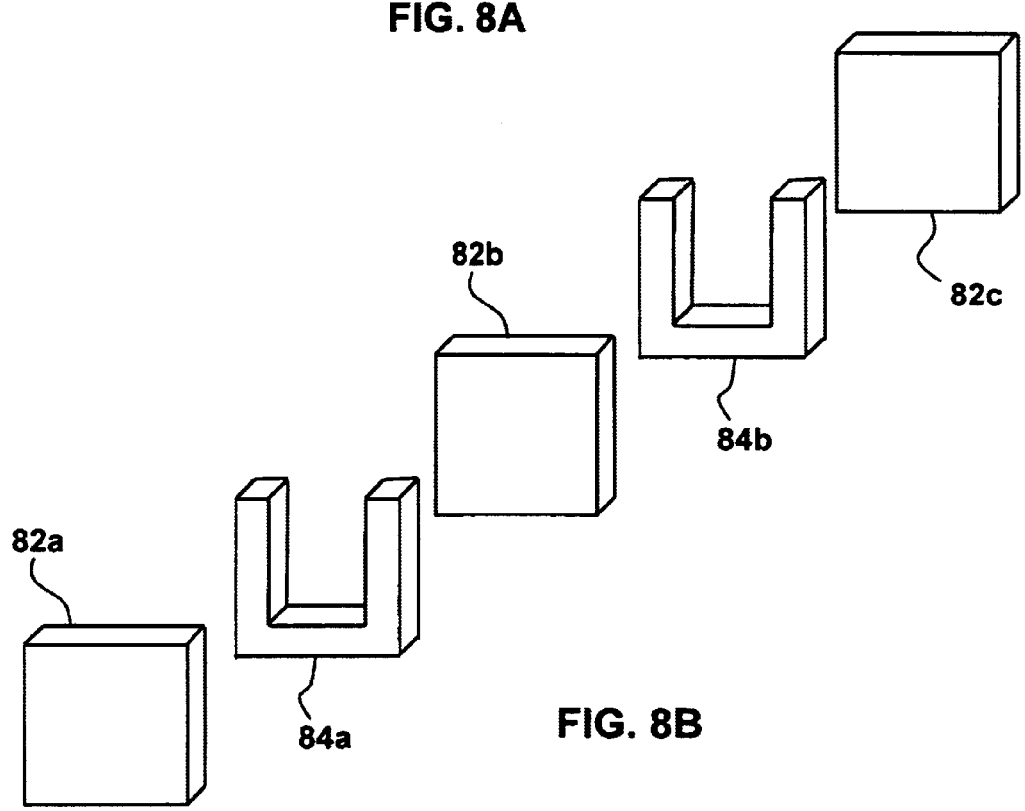

Referring to FIG. 8, there is shown a schematic diagram of tunable multi-cavity etalon 80 in accordance with the present invention. The etalon 80 includes a plurality of self-supporting multi-layer thin film filters 82*a*, 82*b*, 82*c*, alternating with a plurality of spacers 84*a*, 84*b* to form a two cavity etalon. Preferably, the self-supporting filters 82*a*, 82*b*, 82*c*, are multi-layer dielectric optical filters as described heretofore. The spacers 84*a*, 84*b*, which are shown as U-shaped frames, create the dual cavities. Optionally, the spacers 84*a*, 84*b* are any spacer or combination of spacers that lie outside the optical path of the etalon. For example, the U-shaped spacer is optionally replaced with two separate bars disposed on either side of the free-standing thin film filter (e.g., 82*b*). Preferably, the filters 82*a*, 82*b*, 82*c* are coupled to the spacers 84*a*, 84*b*. Optionally, each of the spacers 84*a*, 84*b* is formed from a material having a low coefficient of thermal expansion.

The optical path length of each cavity is tunable (i.e., is controllably changed), via an actuator 83*a*, 83*b* regulated with a controller 81. In one embodiment, the etalon 80 is tuned to improve the thermal stability. In another embodiment, the etalon 80 is tuned to modify the spectral response of the etalon. The optical path length of each cavity is changed together or independently.

For example, in one embodiment, the spacers are formed of a piezo-electric material, such as lead zirconium titanate. In this case, the actuator 83*a* applies a voltage to the spacer 84*a* so that the physical dimensions of the spacer change, thus changing the cavity width and optical path length.

In another embodiment, the spacers are formed from a material having a moderate or higher coefficient of thermal expansion, such as float glass R-6, Schott S-8063™, and/or a metal or metal alloy, such as aluminum. In this case, the actuator 83*a* applies a temperature increase/decrease to change the physical dimension of the spacer, thus changing the cavity width and optical path length.

In yet another embodiment, the spacers form and/or are within a sealed environment. The actuators 83 provide a pressure change within the sealed environment to change the refractive index of the air-gap medium, and hence change the optical path length.

Advantageously, the present invention provides substantially athermal multi-cavity etalons, which offer great versatility and tailorability. For example, each of the athermal multi-cavity etalons discussed above is optionally designed with two, three, four, or more optical cavities, in dependence upon the desired optical performance.

In each of the above embodiments, the spacers are optionally composed of an ultra-low thermal expansion material, a zero thermal expansion material, or a negative thermal expansion material. For example, in one embodiment the spacers are engineered with a coefficient of thermal expansion that compensates for the optical thickness increase/decrease that the reflective coatings exhibit with varying temperature.

Furthermore, in each of the above embodiments the spacer or spacers optionally have a circular, square, or other cross-sectional shape. Alternatively, each spacer is replace by two or more discrete spacers. Optionally, each spacer is replaced by two or more discrete spacers having different compositions to further improve thermal stability. Optionally, the spacers are exposed to the atmosphere, are exposed to the protected atmosphere of a sealed and/or hermetic package, or are sealed up by glass interfaces.

Of course, numerous other embodiments can be envisaged without departing from the spirit and scope of the invention. For example, optical cavities having a structure that deviates from the basic Fabry-Perot etalon are also within the scope of the instant invention. Such deviations, which are made for the purpose of improving some aspect of cavity performance, include, for example, using mirrors that do not have equal reflectivity, deviations from the nominal quarter-wave mirror thickness, imposing certain mathematical constraints on the relationship between the refractive indices of the two mirrors, and/or varying the cavity lengths between cavities in multi-cavity etalons.

What is claimed is:

1. An etalon having beam traversing path in line with a port at an input end into which is input beam is to be launched, comprising:
    a first reflector; and a second reflector opposing the first reflector, the first and second reflectors mounted in a spaced-apart relationship to form a gap therebetween, wherein at least one of the first and second reflectors includes a free-standing multi-layer thin film wherein the gap between the first and second reflectors includes an air-gap portion and a solid portion, the solid portion being a light transmissive material and being disposed in the beam traversing path.

2. An etalon according to claim 1, wherein the reflectors and the solid portion of the etalon are so located such that in operation, a beam launched into the etalon first traverses one of the reflectors and then transverses the solid portion.

3. An etalon comprising:
   a first reflector having a reflective surface and a substrate supporting the reflective surface;
   a second reflector having a reflective surface and a substrate supporting the reflective surface, the second reflector disposed such that its substrate faces the substrate of the first reflector; and,
   a spacer disposed for maintaining the first and second reflectors in a spaced-apart relationship to form a gap therebetween, wherein the spacer has a coefficient of thermal expansion selected to compensate for changes in refractive index and physical dimensions of the substrates resulting from temperature fluctuations.

4. An etalon according to claim 3, wherein the first and second reflectors comprise at least one of self-supporting thin film filters and deposited dichroic filters.

5. An etalon according to claim 3, wherein the spacer provides an air-gap between the first and second reflectors.

6. An etalon according to claim 5, comprising an anti-reflection coating deposited on each of the substrates opposite the reflective surface.

7. An etalon according to claim 3, wherein the etalon is substantially athermal.

8. An etalon according to claim 3, wherein the etalon is a multi-cavity etalon.

9. An etalon according to claim 3, comprising control means for varying an optical path length of the gap to tune the etalon.

10. A multi-cavity etalon comprising:
    a plurality of cavities, each cavity including a light transmissive substrate and a spacer coupled to the light transmissive substrate; and
    a partially transmissive reflector disposed between adjacent cavities
    wherein the spacer in each cavity has a coefficient of thermal expansion selected to compensate for changes in refractive index and physical dimensions of the substrate in the same cavity resulting from temperature fluctuations.

11. A multi-cavity etalon according to claim 10, wherein each substrate comprises an anti-reflection coating deposited thereon.

12. A multi-cavity etalon according to claim 10, wherein the partially transmissive reflector is deposited on one of the light transmissive substrates.

13. A multi-cavity etalon according to claim 10, wherein each spacer comprises a plurality of spacers having different compositions.

* * * * *